United States Patent
Kamiya

(10) Patent No.: US 10,215,592 B2
(45) Date of Patent: Feb. 26, 2019

(54) ELECTRONIC APPARATUS WITH MOVABLE UNIT SUCH AS DISPLAY UNIT MOVABLE IN OPENING AND CLOSING DIRECTION

(71) Applicant: CANON KABUSHIKI KAISHA, Tokyo (JP)

(72) Inventor: Jun Kamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/240,113

(22) Filed: Aug. 18, 2016

(65) Prior Publication Data

US 2017/0052039 A1 Feb. 23, 2017

(30) Foreign Application Priority Data

Aug. 21, 2015 (JP) ................................. 2015-163747

(51) Int. Cl.
*G01D 5/14* (2006.01)
*H04N 5/225* (2006.01)

(52) U.S. Cl.
CPC ........... *G01D 5/145* (2013.01); *H04N 5/2251* (2013.01)

(58) Field of Classification Search
CPC .. H05K 9/0073; H05K 9/0075; H05K 9/0081; H05K 9/0084; H05K 9/0086;
(Continued)

(56) References Cited

U.S. PATENT DOCUMENTS 5,264,792 A * 11/1993 Luetzow ................ G01B 7/023
324/174
5,673,314 A * 9/1997 Olkoski .............. H04M 1/0245
379/433.02
(Continued)

FOREIGN PATENT DOCUMENTS

| CN | 102025896 A | 4/2011 |
| CN | 103907214 A | 7/2014 |
| JP | 2012-042743 A | 3/2012 |

OTHER PUBLICATIONS

The above foreign patent documents were cited in a Nov. 14, 2018 Chinese Office Action, which is enclosed with an English Translation, that issued in Chinese Patent Application No. 201610694508.5.

*Primary Examiner* — David M Schindler
(74) *Attorney, Agent, or Firm* — Cowan, Liebowitz & Latman, P.C.

(57) ABSTRACT

An electronic apparatus which prevents a moving state of a movable unit such as a display unit from being falsely detected. The movable unit is movable in an opening and closing direction with respect to an apparatus main body. When the movable unit is moved with respect to the apparatus main body, a magnetic sensor in the apparatus main body detects a moving state of the movable unit with respect to the apparatus main body by detecting a magnetic field generated by a magnetic field generating unit provided in the movable unit. A Hard Magnetic Material is placed inside the apparatus main body and at such a location that the magnetic sensor is sandwiched between the Hard Magnetic Material and the movable unit being in a closed state. A Soft Magnetic Material is placed inside the apparatus main body and between the magnetic sensor and the Hard Magnetic Material.

9 Claims, 4 Drawing Sheets

(58) Field of Classification Search
CPC ............ H04N 5/23293; H04N 5/2251; H04N 5/2252; G01D 5/142; G01D 5/145; G01R 33/06; G01R 33/07; G01R 33/072; G01R 33/09; G01R 33/091; G01R 33/093; G01R 33/095; G01R 33/096; G01R 33/098; G01B 7/14; G01B 7/30
See application file for complete search history.

(56) References Cited

U.S. PATENT DOCUMENTS

| | | | | |
|---|---|---|---|---|
| 8,718,721 | B2* | 5/2014 | Qin | H04M 1/0214 29/428 |
| 2002/0119802 | A1* | 8/2002 | Hijii | H04M 1/0214 455/575.3 |
| 2005/0146637 | A1* | 7/2005 | Kawauchi | G03B 9/10 348/363 |
| 2006/0215872 | A1* | 9/2006 | Guenther | H04R 9/02 381/412 |
| 2011/0227565 | A1* | 9/2011 | Morton | G01N 3/56 324/225 |

\* cited by examiner

ELECTRONIC APPARATUS WITH MOVABLE UNIT SUCH AS DISPLAY UNIT MOVABLE IN OPENING AND CLOSING DIRECTION

BACKGROUND OF THE INVENTION

Field of the Invention

The present invention relates to an electronic apparatus including an image pickup apparatus such as a digital camera or a digital video camera having a movable unit such as a display unit which is movable in an opening and closing direction with respect to an apparatus main body.

Description of the Related Art

There are known electronic apparatuses such as a digital camera and a digital video camera which have a display unit that is able to slide in an opening and closing direction, or a display unit that is able to rotationally move in an opening and closing direction with respect to an apparatus main body and is able to rotate in an opened state. In such electronic apparatuses, in response to a sliding motion of the display unit or a rotational motion of the display unit or a rotating motion of the display unit in an opened state, an image displayed on the display unit is selectively turned on or off, or an image displayed on the display unit is vertically or horizontally flipped. According to a conventional technique that has been proposed, a magnet and a magnetic sensor, which are noncontact detection means, are used to detect a sliding motion of the display unit, or a rotational motion of the display unit or a rotating motion of the display unit in an opened state from the viewpoint of, for example, saving space and increasing reliability (see Japanese Laid-Open Patent Publication (Kokai) No. 2012-42743).

However, according to Japanese Laid-Open Patent Publication (Kokai) No. 2012-42743, affected by the residual magnetic flux density of magnetic components provided inside the apparatus main body or the display unit, the magnetic senor may detect a motion of the display unit at an angle different from an actual angle or may detect the magnet even when the magnet has not come close to the magnetic sensor. To avoid false detection arising from the residual magnetic flux density, it is necessary to place the magnetic sensor at an appropriate position and choose an appropriate material for the magnetic sensor, but from the viewpoint of costs, workability, and material characteristics, it is difficult to change materials of all magnetic components that may affect detection to nonmagnetic metal or resin.

Moreover, even a component made of nonmagnetic metal or the like has a bent portion that may become magnetized by machining. Additionally, detection sensitivity may increase due to variations in the positions at which the magnetic sensor is placed, variations in the sensitivity of the magnetic sensor, changes in temperature, or the like, and it may be affected by the residual magnetic flux density. The residual magnetic flux density of magnetic components inside the apparatus main body or the like increases with magnetic holding power, but this magnetism holding power changes due to machining as well. It is thus difficult to estimate the magnetic holding power in advance through simulation or the like, and redesign or choice according to the sensitivity of the magnetic sensor may be required for accurate detection.

SUMMARY OF THE INVENTION

The present invention provides an electronic apparatus which is capable of preventing a moving state of a movable unit such as a display unit from being falsely detected.

Accordingly, the present invention provides an electronic apparatus comprising an apparatus main body, a movable unit configured to be movable in an opening and closing direction with respect to the apparatus main body, a magnetic field generating unit configured to be provided in the movable unit and generate a magnetic field, a magnetic sensor configured to be provided in the apparatus main body, and when the movable unit is moved with respect to the apparatus main body, detect a moving state of the movable unit with respect to the apparatus main body by detecting the magnetic field generated by the magnetic field generating unit, a Hard Magnetic Material configured to be provided inside the apparatus main body and at such a location that the magnetic sensor is sandwiched between the Hard Magnetic Material and the movable unit being in a closed state, and a Soft Magnetic Material configured to be provided inside the apparatus main body and between the magnetic sensor and the Hard Magnetic Material.

According to the present invention, even when the sensitivity of the magnetic sensor varies, a moving state of the movable unit with respect to the apparatus main body is accurately detected, and hence a moving state of the movable unit is prevented from being falsely detected.

Further features of the present invention will become apparent from the following description of exemplary embodiments (with reference to the attached drawings).

DESCRIPTION OF THE EMBODIMENTS

Hereafter, an exemplary embodiment of the present invention will be described with reference to the drawings.

Figure 1A:
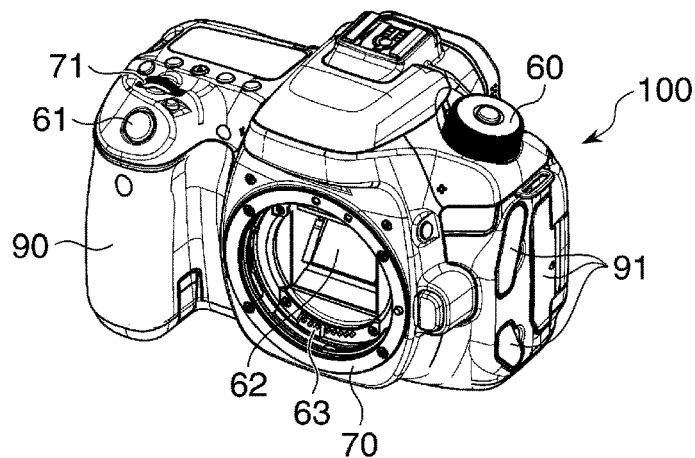
FIG. 1A is a perspective view showing a digital camera, which is an exemplary embodiment of an electronic apparatus according to the present invention, as seen from the front (subject side)
Figure 1B:
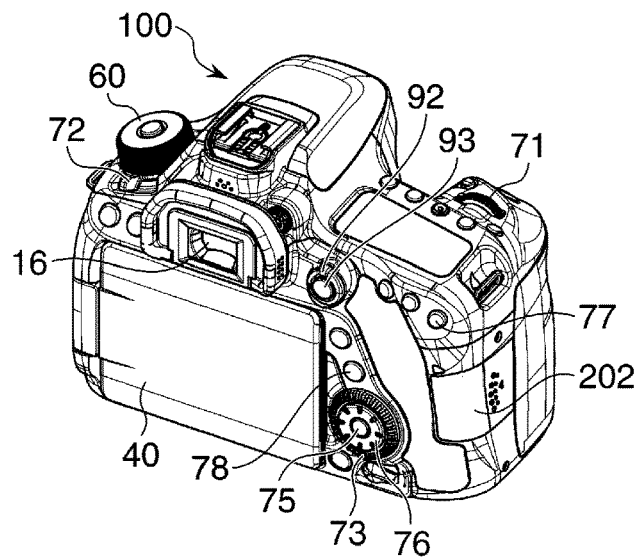
FIG. 1B is a perspective view showing the digital camera in FIG. 1A as seen from behind.
Figure 1C:
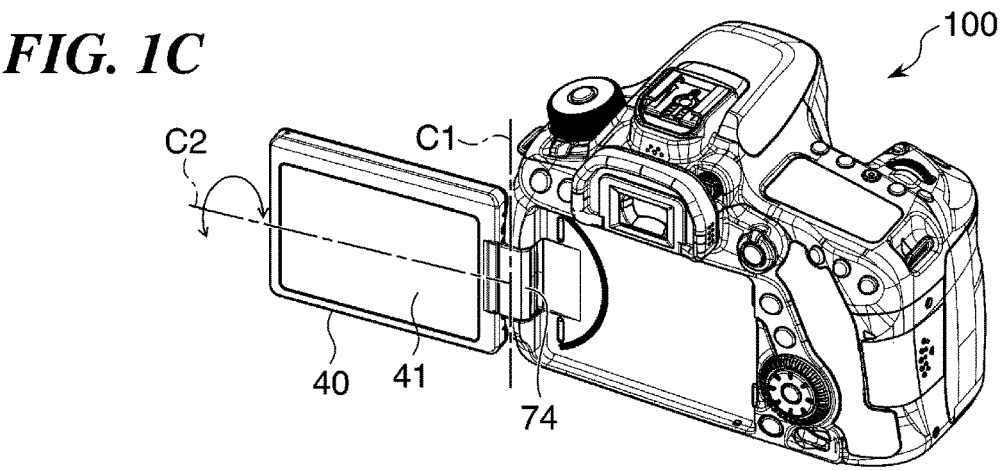
FIG. 1C is a perspective view showing the digital camera in FIG. 1B with its display unit opened.

FIG. 1A is a perspective view showing a digital camera, which is the exemplary embodiment of an electronic apparatus according to the present invention, as from the front (subject side), FIG. 1B is a perspective view showing the digital camera in FIG. 1A as seen from behind, and FIG. 1C is a perspective view showing the digital camera in FIG. 1B with its display unit opened. It should be noted that although in the present embodiment, the digital camera, which is an exemplary image pickup apparatus, is taken as an example of the electronic apparatus, the electronic apparatus is not limited to this.

As shown in FIG. 1A, in the digital camera according to the present embodiment, a mounting unit 70 on which an interchangeable lens unit, not shown, is removably mounted is provided on a front side of a camera main body 100. An instant return mirror 62 and a communication terminal 63 are provided in the mounting unit 70, and communications are carried out between the camera main body 100 and the lens unit via the communication terminal 63. A grip portion 90 is provided on a left side of the mounting unit 70 as the camera main body 100 is viewed from the front, and a release button 61 is provided on top of the grip portion 90. In a side portion of the camera main body 100 on a right side of the mounting unit 70 as the camera main body 100 is viewed from the front, a terminal cover 91 is provided such that it is able to open and close. The camera main body 100 corresponds to an exemplary apparatus main body of the present invention.

As shown in FIG. 1B, a mode dial 60, a main electronic dial 71, a power button 72, and so forth are provided on an upper surface of the camera main body 100. A sub electronic dial 73, a SET button 75, a micro controller 76, an enlargement button 77, a reproducing button 78, an LV lever 92, an LV button 93, an eyepiece finder 16, a slot cover 202, and so forth are provided on a rear side of the camera main body 100. The LV lever 92 is for switching between a still image shooting mode and a moving image shooting mode. The LV button 93 is for selectively turning on and off Live View in the still image shooting mode, and in the moving image shooting mode, the LV button 93 is used to order starting/ending of moving image shooting (recording). The slot cover 202 covers a slot, not shown, through which a recording medium such as a memory card is inserted and withdrawn, such that the slot cover 202 is able to open and close.

As shown in FIG. 1B and FIG. 1C, a display unit 40 having a display panel 41 such as an LCD is provided on the rear side of the camera main body 100. The display unit 40 is supported with respect to the camera main body 100 such that it is able to rotationally move about a rotational axis C1 of a hinge portion 74i in an opening and closing direction a and is able to rotate about a rotational axis C2 of the hinge portion 74 when it is in an opened state shown in FIG. 1C. The display unit 40 corresponds to an exemplary movable unit of the present invention.

Figure 2A:
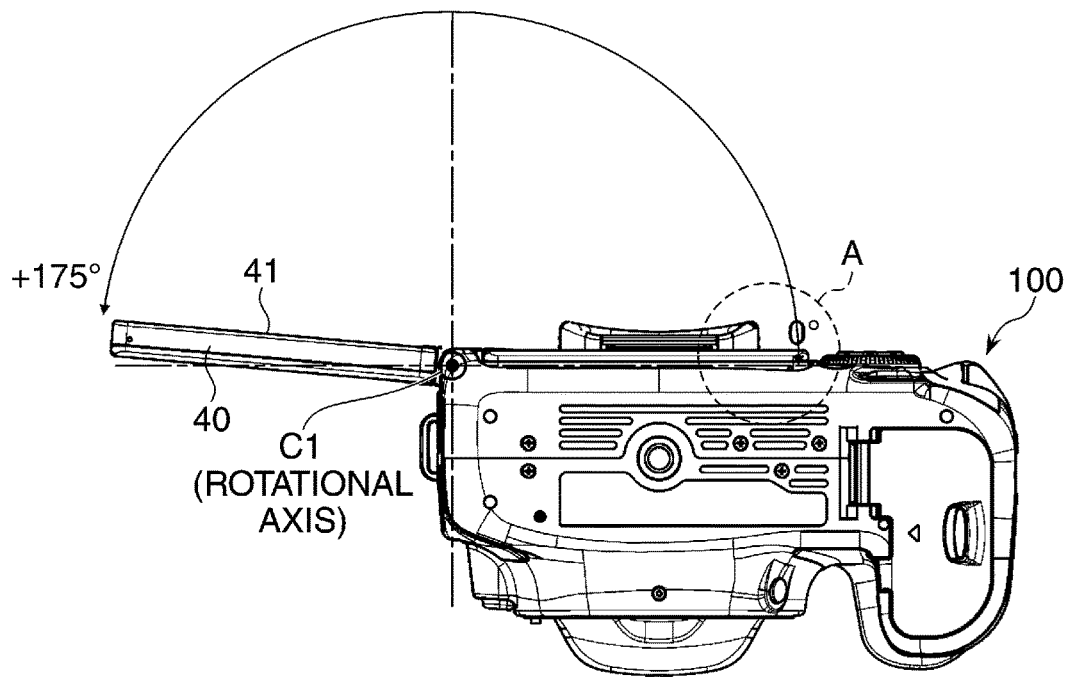
FIGS. 2A and 2B are views useful in explaining a movable range of the display unit with respect to a camera main body.

A description will now be given of a movable range of the display unit 40 with respect to the camera main body 100. FIG. 2A is a view showing the camera main body 100 as seen from below. A shown in FIG. 2A, the display unit 40 is allowed to rotationally move in an opening direction from 0° (closed position) to approximately 175°. It should be noted that for the convenience of explanation, FIG. 2A shows both an opened state and a closed state of the display unit 40 with respect to the camera main body 100.

Figure 2B:
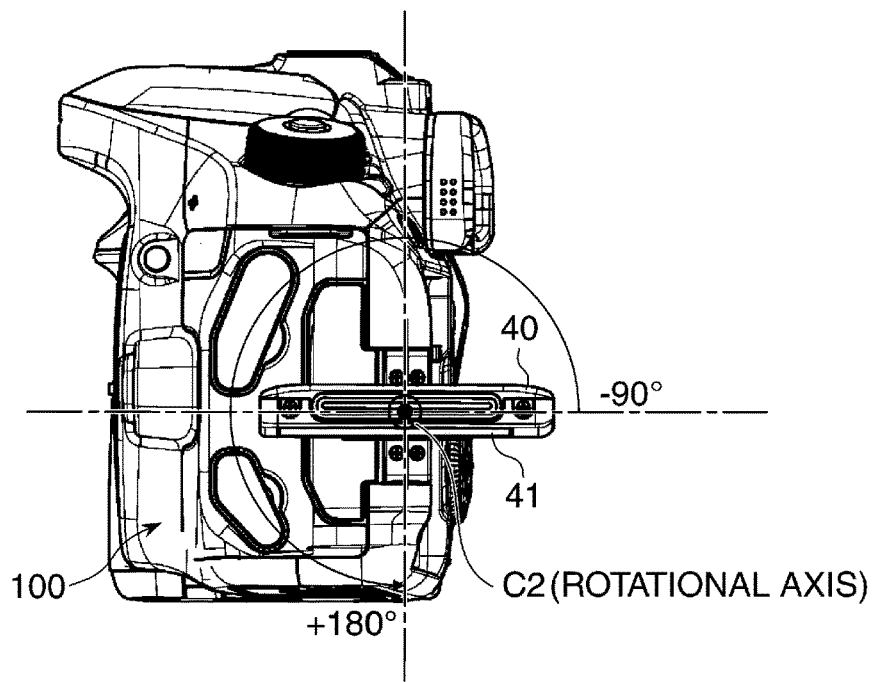

FIG. 2B is a side view showing a state where the display unit 40 is rotated −90° about the rotational axis C2 in a state where with respect to the camera main body 100, it is opened 175° about the rotational axis C1. A shown in FIG. 2B, the display unit 40 is allowed to rotate about the rotational axis C2 from approximately −90° to approximately +180°.

Figure 3:
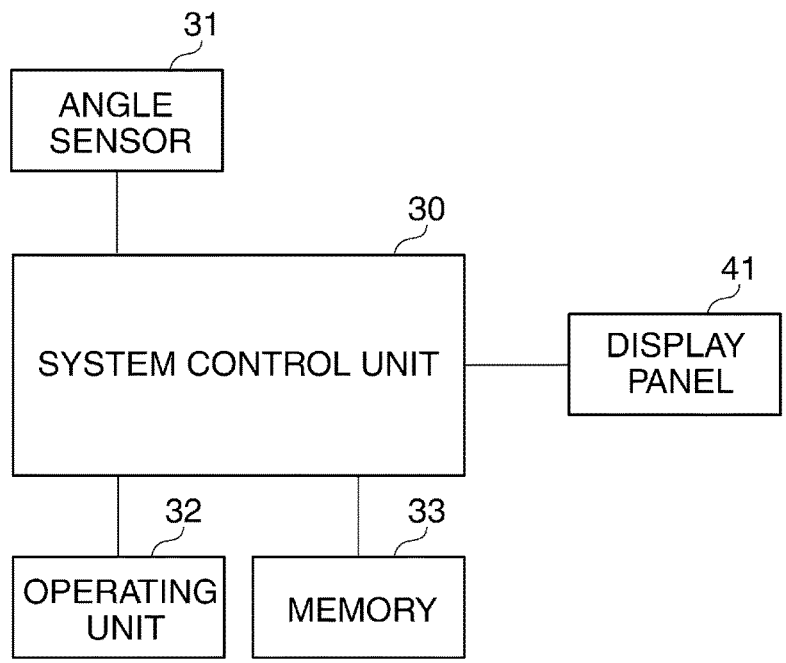
FIG. 3 is a block diagram useful in explaining how display on a display panel is controlled.

FIG. 3 is a block diagram useful in explaining how display on the display panel 41 is controlled. A system controller 30 of the camera main body 100 controls the overall digital camera and controls image display, operations, and so forth. An operating unit 32 includes the release button 61, the main electronic dial 71, and so forth of the camera main body 100 and accepts operations from a user. A memory 33 is provided in the camera main body 100 and stores, for example, control programs. The system control unit 30 carries out predetermined processes in accordance with the control programs stored in the memory 33.

When the display unit 40 is closed with respect to the camera main body 100 from the state in FIG. 1C to the state in FIG. 1B, and an angle sensor 31 detects that the opening angle of the display unit 40 has become equal to or smaller than a certain angle, the system control unit 30 turns off the light of the display panel 41 and turns off functions of the display panel 41. This control is intended to save energy by turning off the light of the display panel 41 and prevent false detection of the display panel 41 when it has a touch panel function or the like.

For example, when an exterior member of the camera main body 100 is made of conductive resin, a touch panel may respond when the display panel 41 and the exterior member come within a predetermined distance of each other. It is thus necessary to turn off the functions of the display panel 41 when the opening angle of the display unit 40 is wide to some extent, but when it is opened too much, turning off the functions of the display panel 41 would cause the convenience of a photographer to become worse. In the present embodiment, the opening angle of the display unit 40 detected when the functions of the display unit 41 are to be turned off is set to approximately 7° to 8°.

When the display unit 40 is opened with respect to the camera main body 100 from the state in FIG. 1B to the state in FIG. 1C, and the angle sensor 31 detects that the opening angle of the display unit 40 has become greater than a certain angle, the system control unit 30 lights the display panel 41 and turns on the functions of the display panel 41.

The angle sensor 31 is not particularly limited, but in the present embodiment, a Hall element (magnetic sensor) 12 provided in the camera main body 100 is used. The Hall element 12 detects a magnetic field vertical to a mounting surface.

Figure 4:
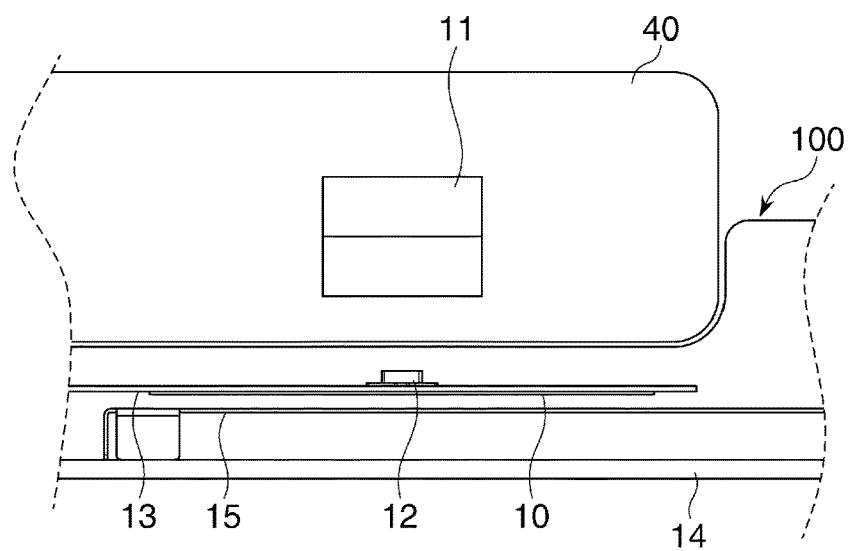
FIG. 4 is an enlarged fragmentary cross-sectional view showing an area A in FIG. 2A.
Figure 5A:
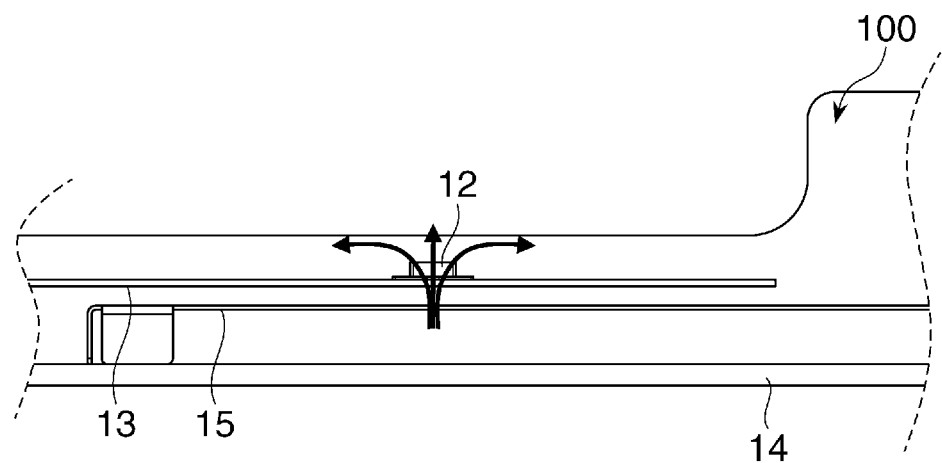
FIGS. 5A and 5B are cross-sectional views schematically showing a magnetic field which is generated by a shield case when the display unit has rotationally moved in an opening direction from a closed position with respect to the camera main body.
Figure 5B:
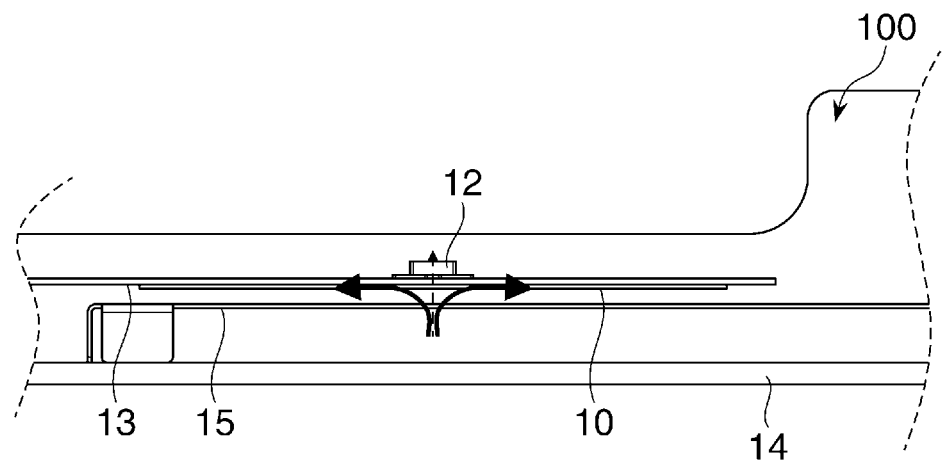

Referring next to FIGS. 4, 5A, and 5B, a description will be given of the Hall element 12 and a neodymium magnet 11 that constitute the angle sensor 31. FIG. 4 is an enlarged fragmentary cross-sectional view showing an area A in FIG. 2A. It should be noted that in FIG. 4, for the sake of brevity, only a contour of the exterior member of the camera main body 100 is shown with some members omitted.

As shown in FIG. 4, the neodymium magnet 11, which is a magnetic field generating unit, is provided inside the display unit 40 and generates a magnetic field in a direction vertical to the surface, on which the Hall element 12 is mounted, on the camera main body 100 side. At this time, the north pole and the south pole may be placed in either orientation. A main substrate 14 is disposed inside the camera main body 100, and many electronic components (not shown) including the system control unit 30 are mounted on the main substrate 14.

The Hall element 12 is mounted on a flexible substrate 13 placed inside the camera main body 100. The flexible substrate 13 is placed between the resin exterior of the camera main body 100 and the main substrate 14 and fixed by being attached to the resin exterior from an inner side. The Hall element 12 is mounted on a surface of the flexible substrate 13 which faces the resin exterior, and a detection signal from the Hall element 12 is transmitted to the system controller 30 by the flexible substrate 13.

A shield case 15 (Hard Magnetic Material) is placed between the flexible substrate 13 and the main substrate 14. The shield case 15, which is an electromagnetic wave shield for preventing electromagnetic interference of extraneous emissions with the main substrate 14, is mounted on the main substrate 14 so as to reduce extraneous emissions from the main substrate 14. The shield case 15 is formed by, for example, stamping a tinned steel plate.

In general, a steel plate has high magnetic permeability, and hence when the display unit 40 rotationally moves in the closing direction to cause the neodymium magnet 11 to approach the exterior of the camera main body 100, the steel plate acts as a yoke and has the effect of increasing the density of vertical magnetic flux applied to the Hall element 12. Acting as a yoke makes it possible to apply relatively dense magnetic flux to the Hall element 12 even if the neodymium magnet 11, which is relatively small and inexpensive, is used, and makes it possible to detect an opening angle of the display unit 40 when it is wide to some extent. On the other hand, the steel plate is a sort of a Hard Magnetic Material with high magnetic holding power, and when it becomes magnetized due to approach of the neodymium magnet 11, the residual magnetic flux density remains even after the neodymium magnet 11 moves away from the steel plate.

A soft magnetic body 10 (Soft Magnetic Material) is shaped like a sheet and attached to a rear side of the surface of the flexible substrate 13 on which the Hall element 12 is mounted. The soft magnetic body 10 has high magnetic permeability but has low magnetic holding power, and in the present embodiment, a sheet molded by mixing metallic magnetic powder in resin is used. Such sheets are generally used to deal with, for example, extraneous emission of electromagnetic waves and easily available at relatively low prices, and there is also a wide range of their sizes and characteristics.

Since the soft magnetic body 10 has high magnetic permeability, and when the neodymium magnet 11 approaches, it acts as a yoke and has the effect of increasing the density of magnetic flux in a vertical direction applied to the Hall element 12 as with a steel plate. On the other hand, the soft magnetic body 10 has low magnetic holding power, and hence even when it becomes magnetized due to approach of the neodymium magnet 11, the residual magnetic flux density hardly remains after the neodymium magnet 11 moves away.

As shown in FIG. 4, the soft magnetic body 10 is attached to the rear side of the surface of the flexible substrate 13 on which the Hall element 12 is mounted, the distance between the soft magnetic body 10 and the Hall element 12 is shorter than the distance between the soft magnetic body 10 and the shield case 15. Namely, the soft magnetic body 10 is provided between the Hall element 12 and the shield case 15 so that the distance between the soft magnetic body 10 and the Hall element 12 can be shorter than the distance between the soft magnetic body 10 and the shield case 15.

FIG. 5A is a cross-sectional view schematically showing a magnetic field that is generated by the shield case 15 when the display unit 40 has rotationally moved about the rotational axis C1 in the opening direction from the closed position with respect to the camera main body 100 in a case where the soft magnetic body 10 is not placed. FIG. 5B is a cross-sectional view schematically showing a magnetic field that is generated by the shield case 15 when the display unit 40 has rotationally moved about the rotational axis C1 in the opening direction from the closed position with respect to the camera main body 100 in a case where the soft magnetic body 10 is placed.

As shown in FIG. 5A, when the display unit 40 has rotationally moved in the opening direction with respect to the camera main body 100, and the neodymium magnet 11 has moved away from the Hall element 12, a magnetic field from the shield case 15 having the residual magnetic flux density is applied to the Hall element 12. For this reason, the strength of this magnetic field needs to be equal to or lower than a threshold of the detection angle of the Hall element 12. When the strength of the magnetic field exceeds the threshold of the detection angle of the Hall element 12, detection by the Hall element 12 occurs at all times, leading to false detection. Even if no false detection occurs, the Hall element 12 may detect an angle different from expected angles as long as the residual magnetic flux density applied to the Hall element 12 is high.

On the other hand, factors considered to affect the detection angle of the Hall element 12 include variations in the sensitivity of the Hall element 12, variations in the positions at which the Hall element 12 is placed, changes in sensitivity with changes in temperature, changes in magnetic holding power due to machining of a magnetic body inside the camera main body 100, variations in the positions at which the magnetic body is placed, changes in magnetic force with changes in temperature, and so forth.

In order to make the detection angle of the Hall element 12 accurate, that is, in order to accurately detect a rotationally moving state of the display unit 40 with the above effects taken into consideration, it is necessary to reduce the effect of the residual magnetic flux density from a magnetic body inside the camera main body 100 such as the shield case 15 on the Hall element 12.

Accordingly, in the present embodiment, as shown in FIG. 5B, the shield case 15 is placed in proximity to the surface on which the Hall element 12 is mounted such that the surface on which the Hall element 12 is mounted is away from a bent portion and/or a machined portion such as a cut portion of the shield case 15, and the sheet-like soft magnetic body 10 is placed in proximity to the Hall element 12. Due to the presence of the sheet-like soft magnetic body 10, a magnetic field easily flows in a planar direction thereof, and hence the strength of a magnetic field vertical to the surface on which the Hall element 12 is mounted is reduced accordingly.

Since the soft magnetic body 10 is placed in proximity to the Hall element 12, it is possible to effectively prevent a magnetic field from flowing to arrive at and being applied to the Hall element 12. Moreover, the residual magnetic flux density in the shield case 15 arrives at the soft magnetic body 10 after it decays in an air space, and this further enhances the effect of the soft magnetic body 10. Also, placing the Hall element 12 in substantially the central part of the soft magnetic body 10 and making the area of the soft magnetic body 10 sufficiently greater than that of the Hall element 12 effectively prevents a magnetic field from flowing to arrive at the Hall element 12.

Further, in order to enable a magnetic field to easily flow in a planar direction with respect to a thickness direction of the sheet-like soft magnetic body 10, it is preferred that the size of the soft magnetic body 10 in the planer direction is sufficiently larger than that in the thickness direction. In the present embodiment, for example, the size of the Hall element 12 is 0.5 mm in the thickens direction and 1.6 mm×1.2 mm in the planer direction, and the size of the soft magnetic body 10 is 0.1 mm in the thickens direction and 20 mm×10 mm in the planer direction, and they are arranged such that their longitudinal directions in the planer direction are aligned.

For the same reason, it is further preferred that the soft magnetic body 10 has anisotropic magnetic permeability, and magnetic permeability in the planer direction is higher than that in the thickness direction. If the soft magnetic body 10 is a sheet molded by mixing metallic magnetic powder in resin, such anisotropy is created by dispersion/mixing in metallic magnetic bodies.

As described above, in the present embodiment, even when the sensitivity of the Hall element 12 which is a magnetic sensor varies, a rotationally moving state (moving state) of the display unit 40 with respect to the camera main body 100 is accurately detected, and therefore, a rotationally moving state of the display unit 40 is prevented from being falsely detected.

It should be noted that although in the above description of the embodiment, the display unit 40 which rotationally moves in the opening and closing direction with respect to the camera main body 100 is taken as an example of the movable unit able to move in the opening and closing direction with respect to the apparatus main body, the movable unit is not limited to this. For example, the movable unit may be a display unit that is able to slide in the opening and closing direction with respect to the apparatus main body or a movable unit other than the display unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-163747, filed Aug. 21, 2015, which is hereby incorporated by reference herein in its entirety.

What is claimed is:

1. An image pickup apparatus, comprising:
an apparatus main body;
a display unit configured to be movable about a rotational axis of a hinge portion in an opening and closing direction with respect to said apparatus main body;
a magnetic field generating unit configured to be provided in said display unit and generate a magnetic field;
a magnetic sensor configured to be provided in said apparatus main body, and when said display panel is moved with respect to said apparatus main body, detect a moving state of said display unit with respect to said apparatus main body by detecting the magnetic field generated by said magnetic field generating unit;
a shield configured to be provided inside said apparatus air body and at such a location that said magnetic sensor is sandwiched between said shield and said display unit being in a closed state; and
a magnetic portion configured to be provided inside said apparatus main body and between said magnetic sensor said shield,
wherein an area of said magnetic portion is larger than an area of a surface on which said magnetic sensor is mounted,
wherein each of said shield and said magnetic portion is a magnetic body, said shield having magnetic holding power higher than said magnetic portion, and
wherein said magnetic portion is p between said magnetic sensor and said shield such that a distance between said magnetic portion and said magnetic sensor shorter than a distance between said magnetic portion and said shield.

2. The image pickup apparatus according to claim 1, wherein said shield is tinned steel.

3. The image pickup apparatus according to claim 2, wherein said magnetic portion is a sheet molded by mixing metallic magnetic powder in resin.

4. The image pickup apparatus according to claim 1, wherein said magnetic sensor is mounted in substantially a central part of said magnetic portion.

5. The image pickup apparatus according to claim 1, wherein said magnetic portion has anisotropic magnetic permeability in which the magnetic permeability along a plane of the magnetic portion is higher than magnetic permeability in a thickness direction vertical to the plane of the magnetic portion.

6. The image pickup apparatus according to claim 1, wherein said magnetic sensor is a Hall element that detects a magnetic field vertical to a surface on which said magnetic sensor is mounted.

7. The image pickup apparatus according to claim 1, wherein said shield is a steel plate disposed in a vicinity of the surface on which said magnetic sensor is mounted.

8. The image pickup apparatus according to claim 1, wherein said shield is a steel plate attached as an electromagnetic wave shield to a substrate provided inside said apparatus main body.

9. The image pickup apparatus according to claim 1, wherein said magnetic field generating unit is a neodymium magnet.

* * * * *